United States Patent [19]
Kawada

[11] Patent Number: 5,432,786
[45] Date of Patent: Jul. 11, 1995

[54] MODEM FOR MODULATING AND DEMODULATING MAIN SIGNAL AND SECONDARY SIGNAL WITH CLOCK SYNCHRONIZED SYSTEM AND TRANSFORMING SECONDARY SIGNAL BETWEEN START-STOP SYSTEM AND CLOCK-SYNCHRONIZED SYSTEM

[75] Inventor: Noboru Kawada, Kawasaki, Japan

[73] Assignee: Fujitsu Limited, Kawasaki, Japan

[21] Appl. No.: 280,574

[22] Filed: Jul. 26, 1994

Related U.S. Application Data

[63] Continuation of Ser. No. 9,803, Jan. 27, 1993, abandoned.

[30] Foreign Application Priority Data

Jan. 27, 1992 [JP] Japan .................................. 4-012008

[51] Int. Cl.$^6$ ................................................ H04J 1/08
[52] U.S. Cl. ........................................ 370/69.1; 370/76;
329/304; 332/102; 375/222; 375/261; 375/308
[58] Field of Search ................... 370/13, 17, 69.1, 76,
370/122; 375/8, 9, 39, 67, 7; 379/93; 329/304;
332/103

[56] References Cited

U.S. PATENT DOCUMENTS

| | | | |
|---|---|---|---|
| 4,273,955 | 6/1981 | Armstrong | 370/13 X |
| 4,335,464 | 6/1982 | Armstrong | 370/69.1 X |
| 4,425,664 | 1/1984 | Sherman et al. | 375/8 |
| 4,937,839 | 6/1990 | Motley et al. | 375/8 X |

FOREIGN PATENT DOCUMENTS 2620583  3/1989  France ....................... H04M 11/06

OTHER PUBLICATIONS

"A Digital Signal Processor for Modem Application" by Kohji Doi et al., 298 NEC Research & Development, 1989, Jan., No. 92, Tokyo, Japan.

*Primary Examiner*—Russell W. Blum

[57] ABSTRACT

A modulator receives a main signal synchronizing with a clock and a secondary signal having start and stop bits for each character. The modulator contains a unit for removing the start and stop bits from the secondary signal to generate a clock-synchronizing secondary signal. Then, the clock-synchronizing secondary signal and the main signal are modulated in parallel synchronized with a clock, and modulated signals are frequency division multiplexed. A demodulator receives a frequency division multiplexed modulated signal, and a clock-synchronizing main signal and a clock-synchronizing secondary signal are respectively regenerated by modulation and band separation. The demodulator contains a unit for inserting start and stop bits respectively before and after each character contained in the clock-synchronizing secondary signal to generate a secondary signal in a start-stop system.

28 Claims, 11 Drawing Sheets

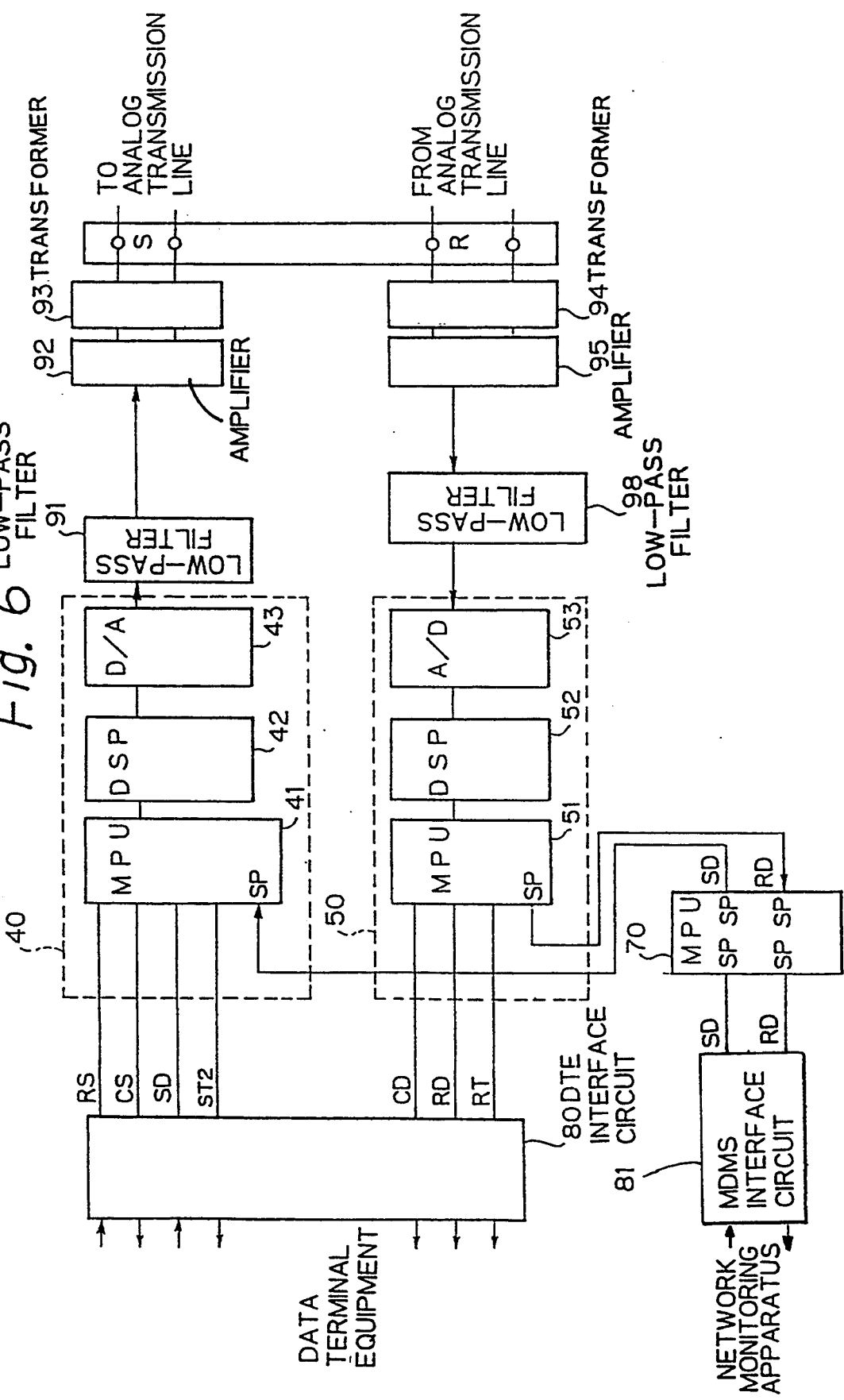

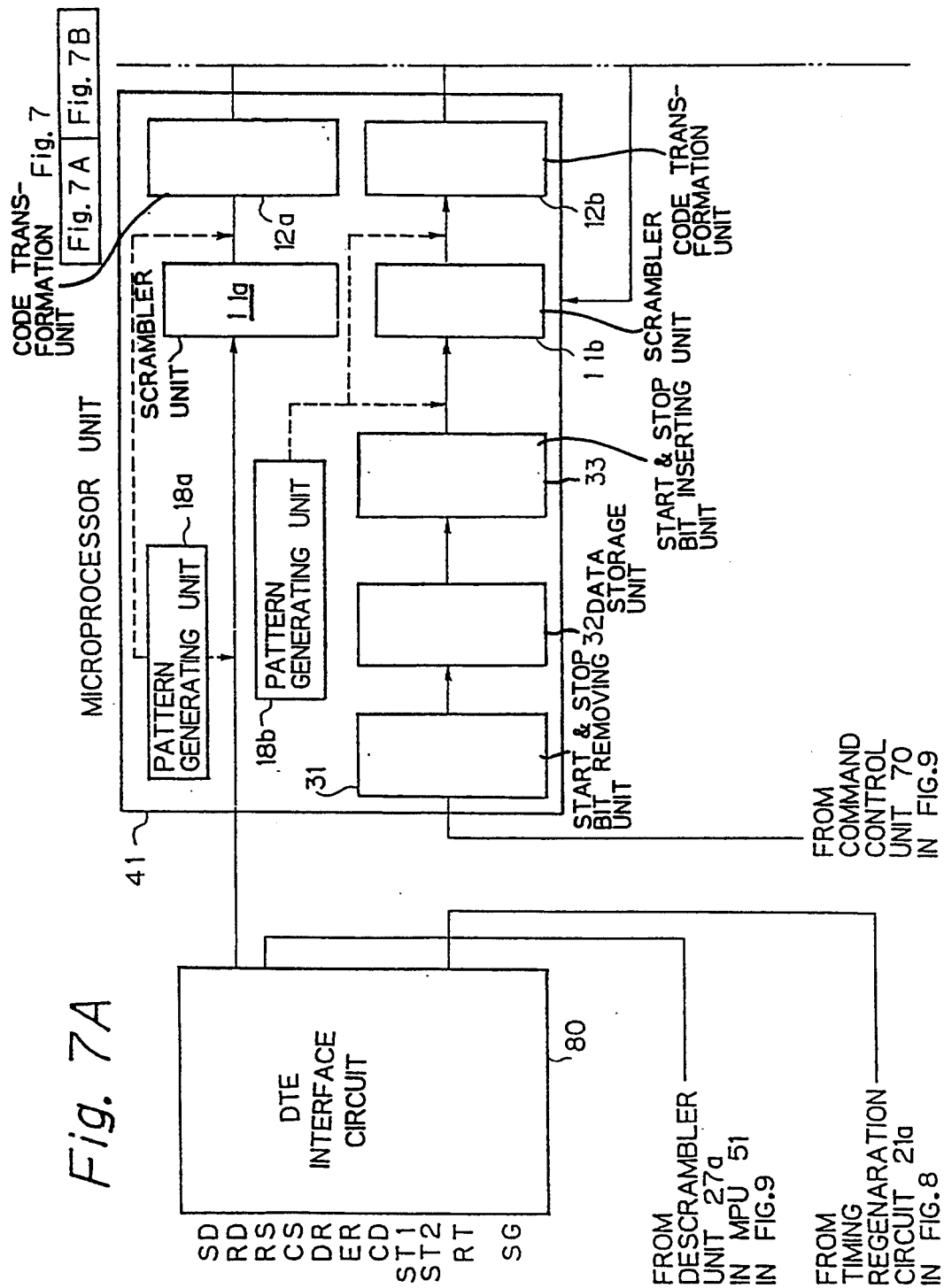

MODEM FOR MODULATING AND DEMODULATING MAIN SIGNAL AND SECONDARY SIGNAL WITH CLOCK SYNCHRONIZED SYSTEM AND TRANSFORMING SECONDARY SIGNAL BETWEEN START-STOP SYSTEM AND CLOCK-SYNCHRONIZED SYSTEM

This is a continuation of application Ser. No. 08/009,803, filed Jan. 27, 1993, now abandoned.

BACKGROUND OF THE INVENTION (1) Field of the Invention

The present invention relates to a modulator, a demodulator, and a modem containing the modulator and the demodulator. The present invention relates, in particular to a modem having provision for modulating and demodulating signals carrying information on conditions of the modem and another modem connected with the modem through an analog transmission line, through a secondary channel which is provided in addition to a main channel. The main channel and the secondary channel are frequency division multiplexed within a frequency band of the analog transmission line.

(2) Description of the Related Art

FIG. 1 is a diagram illustrating an on-line information processing system wherein a plurality of pieces of data terminal equipment are connected through analog transmission lines to a host computer. In FIG. 1, reference numeral 900 denotes a host computer, 901 denotes a communication control processor, 903 denotes a network monitoring apparatus, $911_1$ to $911_n$ each denote a modem on the host computer side, $912_1$ to $912_n$ each denote a modem on the terminal side, $913_1$ to $913_n$ each denote a piece of data terminal equipment, and $914_1$ to $914_n$ each denote an analog transmission line. For example, the host computer 900 and the communication control processor 901 are provided in a main office of a company, and the plurality of pieces of data terminal equipment are respectively positioned in a plurality of branch offices. Digital signals are transmitted between the host computer 900 and the plurality of pieces of data terminal equipment $913_1$ to $913_n$ through the analog transmission lines $914_1$ to $914_n$. When transmitting the digital signals through the analog transmission lines $914_1$ to $914_n$, the digital signals are modulated to analog signals by the modulators on transmitter sides, transmitted through the analog transmission lines, and demodulated to digital signals by the demodulators on receiver sides. Each modem $911_1$ to $911_n$ and $914_1$ to $914_n$ has provision for monitoring various conditions thereof, and a secondary channel is provided in addition to a main channel for transmitting the above digital signals.

As mentioned above, the main channel and the secondary channel are frequency division multiplexed within a frequency band of the analog transmission line. FIG. 2 is a diagram illustrating frequency bands allocated for the main channel and the secondary channel within the frequency band of the analog transmission line (0.3 to 3.4 kHz). As indicated in FIG. 2, the frequency band for the secondary channel is allocated on the lower frequency side of the frequency band of the main channel, separated from the frequency band of the main channel. In the example of FIG. 2, the frequency band of the main channel ranges from 600 to 3,000 Hz, and the frequency band of the secondary channel ranges from 311 to 359 Hz. The center frequencies of the frequency bands of the main channel and the secondary channel are 1,800 and 335 Hz, respectively.

The network monitoring apparatus 903 collects information on the conditions monitored by the respective modems $911_1$ to $911_n$ and $914_1$ to $914_n$ through the above secondary channels and the signal lines $915_1$ to $915_n$. FIG. 3 is a diagram illustrating a connection between the network monitoring apparatus 903 and the plurality of modems $911_1$ to $911_n$ on the side of the host computer 900. As indicated in FIG. 3, the plurality of modems $911_1$ to $911_n$ are connected with the network monitoring apparatus 903 in the form of a bus connection. The signal lines $915_1$ to $915_n$ connecting the network monitoring apparatus 903 with the plurality of modems $911_1$ to $911_n$ are balanced signal lines in accordance with RS485, and the network monitoring apparatus 903 collects the above information by polling the respective modems $911_1$ to $911_n$. In the communication between the network monitoring apparatus 903 and the plurality of modems $911_1$ to $911_n$, a start-stop system is used, i.e., a start bit and a stop bit are affixed to each character (comprised of eight bits) in the information transmitted between the network monitoring apparatus 903 and the plurality of modems $911_1$ to $911_n$.

FIG. 4 is a diagram illustrating a construction of a conventional modem which can be used in the system as indicated in FIG. 1. In FIG. 4, reference numeral 800 denotes a piece of data terminal equipment, 110a to 110i each denote a driver circuit, 40' denotes a main signal modulation unit, 50' denotes a main signal demodulation unit, 60a denotes a secondary signal modulation unit, 60b denotes a secondary signal demodulation unit, 70' denotes a microprocessor unit (MPU) as a command control unit, 41' and 51' each denote a microprocessor unit, 42' and 52' each denote a digital signal processor unit (DSP), 43' and 53' each denote a digital to analog converter, 11 denotes a signal adder, 90a and 90b each denote a low-pass filter, 90c and 90d each denote a high-pass filter, and 903 denotes the network monitoring apparatus of FIG. 1.

In the construction of FIG. 4, digital signals supplied from the data terminal equipment 800 are modulated to analog passband signals within the frequency band of the main channel in the main signal modulation unit 40' to be supplied to the signal adder 11. A command or data to be transmitted through the analog transmission line is generated by the microprocessor unit 70', modulated to an analog passband signal in the secondary signal modulation unit 60a, and filtered through the low-pass filter 90a to be supplied to the signal adder 11. Analog signals transmitted from the analog transmission line are supplied to the main signal demodulation unit 50' and the low-pass filter 90b. Frequency components corresponding to the main channel in the analog signals pass through the high-pass filter 90d, are converted to digital signals, and demodulated through the digital signal processor 52' and the microprocessor unit 51'. Frequency components corresponding to the secondary channel in the analog signals pass through the low-pass filter 90b, are converted to digital signals, and demodulated through the secondary signal demodulation unit 60b. The demodulated secondary signals are supplied to the microprocessor unit 70'.

Conventionally, the modulation and demodulation of the main signals are performed in accordance with phase shift keying (PSK) or quadrature amplitude modulation (QAM), and the modulation and demodulation of the secondary signals are performed in accordance with frequency shift keying (FSK). The demodulation in accordance with the frequency shift keying (FSK) can be performed without synchronization with a receiving clock signal regenerated from the received signal, while the demodulation in accordance with the phase shift keying (PSK) or the quadrature amplitude modulation (QAM) must be performed in synchronization with the receiving clock. Therefore, the modulation and demodulation of the main signals are performed by using the digital signal processor and the microprocessor unit, and the modulation and demodulation of the secondary signals are performed by using a one chip modem, which is commercially available and realizes the secondary signal modulation unit 60a and the secondary signal demodulation unit 60b.

Since the modulation and demodulation of the main signals and the secondary signals are carried out in separate hardware, the amount of the hardware is increased, and therefore, the size of and the cost for the modem are increased.

SUMMARY OF THE INVENTION

A first object of the present invention is to provide a modulator, a demodulator, or a modem containing provision for modulating and demodulating a secondary signal which is frequency division multiplexed with a main signal, where the size thereof and the cost for manufacturing the modulator, the demodulator, or the modem is reduced.

A second object of the present invention is to provide a modulator, a demodulator, or a modem containing provision for modulating and demodulating a secondary signal which is frequency division multiplexed with a main signal, where efficiency in transmission of the secondary signal is increased.

According to the first aspect of the present invention, there is provided a modulator containing: a first modulating unit for receiving a first base band signal, and modulating the first base band signal to generate a first modulated signal, where frequency components contained in the first modulated signal are within a first frequency band; a transforming unit for receiving a second base band signal containing at least one set of a predetermined number of successive bits corresponding to a character data, a start bit preceding each set of the predetermined number of successive bits, and a stop bit following each set of the predetermined number of successive bits, and removing the start bit and the stop bit from the second base band signal to generate a third base band signal containing the character data; a second modulating unit for receiving the third base band signal, and modulating the third base band signal to generate a second modulated signal, where frequency components contained in the second modulated signal are within a second frequency band which is separated from the first frequency band; and a signal adding unit for receiving the first and second modulated signals, and adding the first and second modulated signals to generate a frequency division multiplexed signal.

According to the second aspect of the present invention, there is provided a demodulator containing: a first demodulating unit for receiving a frequency division multiplexed signal, and regenerating a first digital signal, where first and second modulated signals are frequency division multiplexed in the frequency division multiplexed signal, frequency components contained in the first modulated signal are within a first frequency band, frequency components contained in the second modulated signal are within a second frequency band which is separated from the first frequency band, the first modulated signal is equivalent to a signal generated by modulating the first digital signal, and the second modulated signal is equivalent to a signal generated by modulating a second digital signal; a second demodulating unit for receiving the frequency division multiplexed signal, and regenerating the second digital signal containing at least one set of a predetermined number of successive bits corresponding to a character data; and a transforming unit for receiving the second digital signal, and inserting a start bit before each set of the predetermined number of successive bits and a stop bit after each set of the predetermined number of successive bits to generate a third digital signal in a start-stop system.

According to the third aspect of the present invention, there is provided a modem containing a modulator and a demodulator. The modulator contains: a first modulating unit for receiving a first base band signal, and modulating the first base band signal to generate a first modulated signal, where frequency components contained in the first modulated signal are within a first frequency band; a first transforming unit for receiving a second base band signal containing at least one set of a predetermined number of successive bits corresponding to a character, a start bit preceding each set of the predetermined number of successive bits, and a stop bit following each set of the predetermined number of successive bits, and removing the start bit and the stop bit from the second base band signal to generate a third base band signal; a second modulating unit for receiving the third base band signal, and modulating the third base band signal to generate a second modulated signal, where frequency components contained in the second modulated signal are within a second frequency band which is separated from the first frequency band; and a signal adding unit for receiving the first and second modulated signals, and adding the first and second modulated signals to generate a frequency division multiplexed signal. The demodulator contains: a first demodulating unit for receiving a frequency division multiplexed signal, and regenerating a fourth digital signal, where third and fourth modulated signals are frequency division multiplexed in the frequency division multiplexed signal, frequency components contained in the third modulated signal are within a third frequency band, frequency components contained in the fourth modulated signal are within a fourth frequency band which is separated from the third frequency band, the third modulated signal is equivalent to a signal generated by modulating the fourth digital signal, and the fourth modulated signal is equivalent to a signal generated by modulating a fifth digital signal; a second demodulating unit for receiving the frequency division multiplexed signal, and regenerating the fifth digital signal containing at least one set of a predetermined number of successive bits corresponding to a character data; and a transforming unit for receiving the fifth digital signal, and inserting a start bit before each set of the predetermined number of successive bits and a stop bit after each set of the predetermined number of successive bits to generate an eighth digital signal in a start-stop system.

BRIEF DESCRIPTION OF THE DRAWINGS

In the drawings:

FIG. 6 is a diagram illustrating the hardware construction of the modem as an embodiment of the present invention;

DESCRIPTION OF THE PREFERRED EMBODIMENTS

Figure 5:
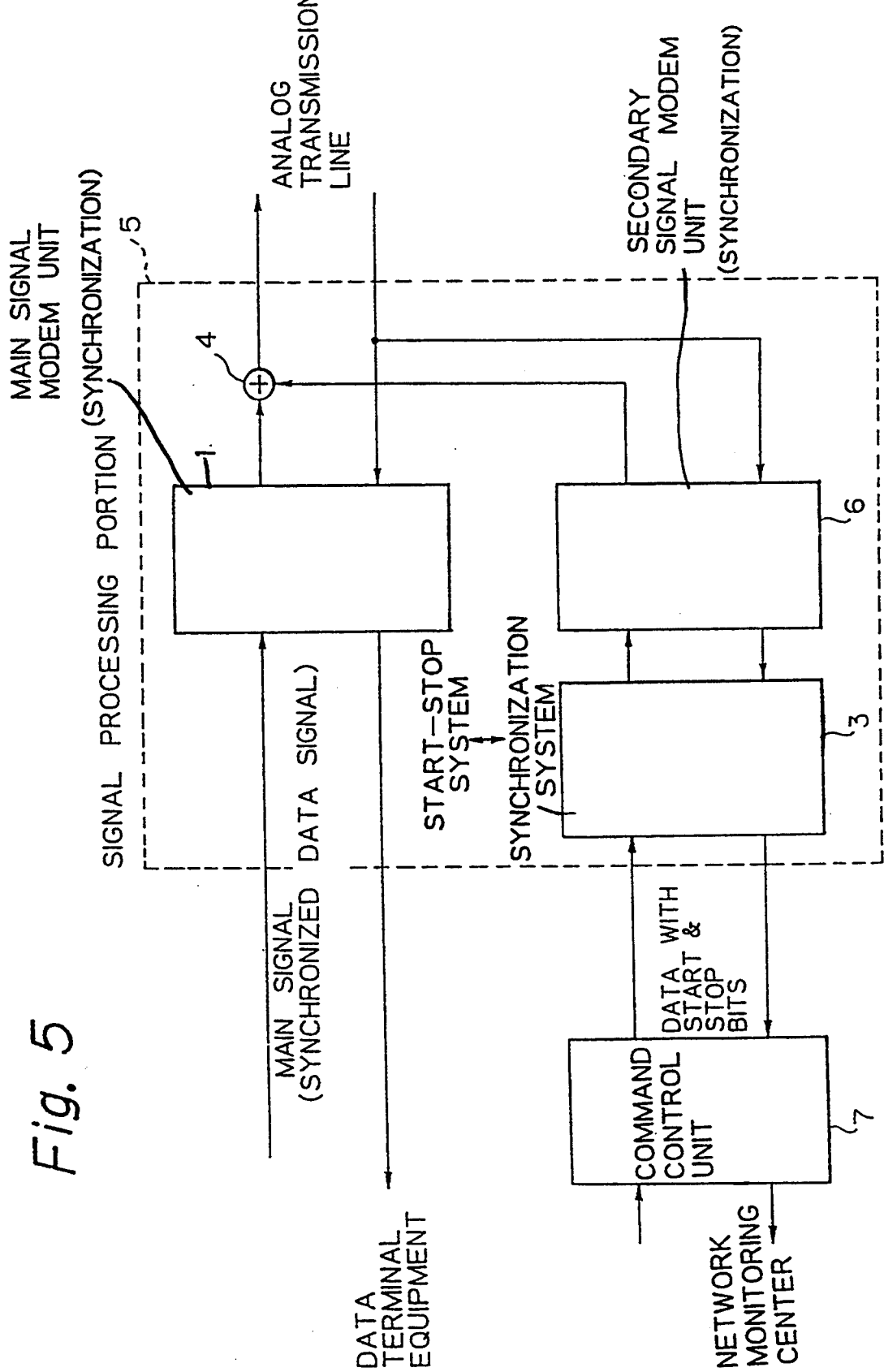
FIG. 5 is a diagram illustrating a basic construction of the modem according to the present invention.

Basic Construction of Invention (FIG. 5)

FIG. 5 is a diagram illustrating a basic construction of the modem according to the present invention. In FIG. 5, reference numeral 1 denotes a main signal modem unit, 3 denotes a signal transformation unit, 4 denotes a signal adder, 5 denotes a signal processing portion, 6 denotes a secondary signal modem unit, and 7 denotes a command control unit. The main signal modem unit 1 and the secondary signal modem unit 6 each contain a modulator and a demodulator. Preferably, the main signal modem unit 1, the signal transformation unit 3, the signal adder 4, and the secondary signal modem unit 6 are realized by at least one digital signal processor. Namely, the main signal modem unit 1, the data transformation unit 3, the signal adder 4, and the secondary signal modem unit 6 are realized by software.

First, the modulating operations carried out in the construction of FIG. 5 are explained below. In the construction of FIG. 5, a first digital signal (main signal) is supplied to the main signal modem unit 1, and the main signal modem unit 1 modulates the first digital signal to generate and supply to the signal adder 4 a first modulated signal (corresponding to a first analog signal). Frequency components contained in the first modulated signal are within a first frequency band. The first digital signal may be a digital signal synchronized with a clock (timing) signal, and the modulation in the main signal modem unit 1 is carried out synchronized with a clock signal. The clock signal used in the modulation may be one of the following clock signals:

(1) a clock signal generated within the modulator (the clock signal generated within a modem is known as the ST2 signal, which is supplied to a piece of data terminal equipment supplying the main signal to the modem synchronized with the ST2 signal);

(2) a clock signal supplied from outside (typically from a piece of data terminal equipment supplying the main signal to the modem) of the modulator (the clock signal supplied from a piece of data terminal equipment together with the main signal is known as the ST1 signal, the data terminal equipment supplies the main signal synchronized with the ST1 signal);

(3) a clock signal regenerated from the received digital signal (main signal), which is known in the conventional modem as the RT signal;

(4) a clock signal regenerated from an analog signal in the main channel received in a demodulator accompanied by the modulator; and (5) a clock signal regenerated from an analog signal in the secondary channel received in the demodulator, the demodulator being accompanied by the modulator.

Parallel to the above operation, a second digital signal is supplied to the signal transformation unit 3. The second digital signal contains at least one set of a predetermined number of successive bits corresponding to a character, a start bit preceding each set of the predetermined number of successive bits, and a stop bit following each set of the predetermined number of successive bits. The second digital signal may be generated by the command control unit 7. The signal transformation unit 3 receives the second digital signal, and removes the start bit and the stop bit from the second digital signal to generate and supply to the secondary signal modem unit 6 a third digital signal. Frequency components contained in the second modulated signal are within a second frequency band which is separated from the first frequency band. The secondary signal modem unit 6 receives the third digital signal, and modulates the third digital signal to generate and supply to the signal adder 4 a second modulated signal (corresponding to a second analog signal). The third digital signal may be a digital signal synchronized with a clock signal, and the modulation in the secondary signal modem unit 6 may be carried out synchronized with a clock signal. The clock signal used in the modulation may be the same (common) clock signal as used in the main signal modem unit 1. The signal adder 4 adds the above first and second modulated signals (first and second analog signals) to generate a frequency division multiplexed signal.

Preferably, the main signal modem unit 1 and the secondary signal modem unit 6 may perform the same type of modulation. Thereby, portions of hardware and software can be made common to the modulating operations in both the main signal modem unit 1 and the secondary signal modem unit 6. Namely, the size of the hardware and software and cost for realizing the main signal modem unit 1 and the secondary signal modem unit 6 can be made small. Since, conventionally the main signal is modulated by the phase shift keying (PSK) or the quadrature amplitude modulation (QAM), and the modulating operation for the phase shift keying (PSK) or the quadrature amplitude modulation (QAM) is performed in synchronization with a clock signal. Therefore, the modulating operation in the secondary signal modem unit 6 must be performed in synchronization with a clock signal when the phase shift keying (PSK) or the quadrature amplitude modulation (QAM) is used. In this case, the third digital signal supplied from the signal transformation unit 3 to the secondary signal modem unit 6 must be synchronized with a clock signal. Namely, in this case, the signal transformation unit 3 transforms the second digital signal in the start-stop system to the third digital signal in the clock-synchronization system.

Alternatively, considering the high transmission rate in the main channel and the low transmission rate in the secondary channel, the quadrature amplitude modulation (QAM) may be used for the modulation in the main channel, and the phase shift keying (PSK) may be used for the modulation in the secondary channel. In this case, portions of hardware and software can also be made common to the modulating operations in both the main signal modem unit 1 (by the quadrature amplitude modulation (QAM)) and the secondary signal modem unit 6 (by the phase shift keying (PSK)). Namely, the size of the hardware and software and cost for realizing the constructions for the modulation in the main signal modem unit 1 and the secondary signal modem unit 6 can be made small. The reason for the above is that the quadrature amplitude modulation (QAM) contains common or similar operations to the operations in the phase shift keying (PSK).

Secondly, the demodulating operations carried out in the construction of FIG. 5 are explained below. In the construction of FIG. 5, a frequency division multiplexed modulated signal is supplied to the main signal modem unit 1 and the secondary signal modem unit 6. The frequency division multiplexed modulated signal is a signal wherein first and second modulated signals are frequency division multiplexed, frequency components contained in the first modulated signal are within the above first frequency band, and frequency components contained in the second modulated signal are within the above second frequency band which is separated from the first frequency band. In the main signal modem unit 1, a first base band signal which is equivalent to a signal generated by demodulating the first modulated signal, is obtained. The first base band signal is a digital signal synchronized with a clock signal regenerated from the first base band signal. Parallel to the above demodulating operation in the main signal modem unit 1, in the secondary signal modem unit 6, a second base band signal which is equivalent to a signal generated by demodulating the second modulated signal, is obtained. The second base band signal is a digital signal synchronized with a clock signal regenerated from the second base band signal, and contains at least one set of a predetermined number of successive bits corresponding to a character. The second base band signal is supplied to the signal transformation unit 3. In the signal transformation unit 3, a start bit is inserted before each set of the predetermined number of successive bits, and a stop bit is inserted after each set of the predetermined number of successive bits to generate a secondary signal in a start-stop system.

Similar to the modulation explained above, the first and second modulated signals are preferably modulated by the same type of modulation, and thus the main signal modem unit 1 and the secondary signal modem unit 6 perform the same type of demodulation. Thereby, portions of hardware and software can be made common to the demodulating operations in both the main signal modem unit 1 and the secondary signal modem unit 6. Namely, the size of the hardware and software and cost for realizing the main signal modem unit 1 and the secondary signal modem unit 6 can be made small. Since, conventionally the main signal is modulated by the phase shift keying (PSK) or the quadrature amplitude modulation (QAM), and the demodulating operation for the phase shift keying (PSK) or the quadrature amplitude modulation (QAM) is performed in synchronization with a clock signal regenerated from the first base band signal. Therefore, the demodulating operation in the secondary signal modem unit 6 must be performed in synchronization with a clock signal when the phase shift keying (PSK) or the quadrature amplitude modulation (QAM) is used. In this case, the second base band signal supplied from the secondary signal modem unit 6 to the signal transformation unit 3 must be synchronized with the clock signal. Namely, in this case, the signal transformation unit 3 transforms the second digital signal in the start-stop system to the second base band signal (secondary signal) in the clock-synchronization system.

Similar to the modulation explained above, alternatively, considering the high transmission rate in the main channel and the low transmission rate in the secondary channel, the quadrature amplitude modulation (QAM) may be used in the main channel, and the phase shift keying (PSK) may be used in the secondary channel. In this case, portions of hardware and software can also be made common to the demodulating operations in both the main signal modem unit 1 (by the quadrature amplitude modulation (QAM)) and the secondary signal modem unit 6 (by the phase shift keying (PSK)). Namely, the size of the hardware and software and cost for realizing the constructions for the demodulation in the main signal modem unit 1 and the secondary signal modem unit 6 can be made small.

Hardware Construction of Embodiment of Modem (FIG. 6)

FIG. 6 is a diagram illustrating the hardware construction of the modem as an embodiment of the present invention. In FIG. 6, reference numeral 40 denotes a modulation unit, 50 denotes a demodulation unit, 41 and 51 each denote a microprocessor unit, 42 and 52 each denote a digital signal processor (DSP), 43 and 53 each denote a digital to analog converter, 70 denotes a microprocessor unit (MPU) as a command control unit, 80 denotes a DTE interface circuit, 81 denotes a MDMS (modem monitoring system) interface circuit, 91 and 98 each denote a low-pass filter, 92 and 95 each denote an amplifier, and 93 and 94 each denote a transformer. The DTE interface circuit 80 is provided for shifting levels of the signals between the modem and the data terminal equipment. In the DTE interface circuit 80, RS denotes a terminal for a signal of "Request to Send", CS denotes a terminal for a signal of "Clear to Send", SD denotes a terminal for a signal of "Transmitted Data", CD denotes a terminal for a signal of "Clear Detector", RD denotes a terminal for a signal of "Received Data", ST2 denotes a terminal for a timing signal of "Send Timing", and RT denotes a terminal for a timing signal of "Receive Timing". Namely, timing signals ST2 and RT are transmitted between the modem and the data terminal equipment 800 in synchronization with the data signals SD and RD, respectively.

In the construction of FIG. 6, a main digital signal supplied from the data terminal equipment is supplied through the DTE interface circuit 80 to the modulation unit 40, and modulated to a first passband signal within the frequency band of the main channel by the microprocessor unit 41 and the digital signal processor 42 in the modulation unit 40. A digital signal carrying a command or data to be transmitted through the analog transmission line is generated by the microprocessor unit 70, and is also supplied to the modulation unit 40 to be modulated to a second passband signal within the frequency band of the secondary channel by the microprocessor unit 41 and the digital signal processor 42 in the modulation unit 40. The first and second passband signals are summed, and the summed passband signal is converted to an analog passband signal. The analog passband signal generated in the modulation unit 40 is filtered through the low-pass filter to eliminate unnecessary frequency components, amplified in the amplifier 92, and transmitted through the transformer 93 and the terminal S onto the analog transmission line.

An analog passband signal transmitted through the analog transmission line is received at the terminal R, and transformed by the transmitter 94, amplified in the amplifier 95, and filtered through the low-pass filter 98 to be supplied to the demodulation unit 50. In the demodulation unit 50, the analog passband signal output from the low-pass filter 98 is converted to a digital passband signal by the analog to digital converter 53. The digital passband signal is demodulated to generate first and second base band signals by the microprocessor unit 51 and the digital signal processor 52, where frequency components of the first base band signal are within the frequency band of the main channel, and frequency components of the second base band signal are within the frequency band of the secondary channel. The first base band signal is supplied to the DTE interface circuit 80, and the second base band signal is supplied to the microprocessor unit 70.

Figure 1:
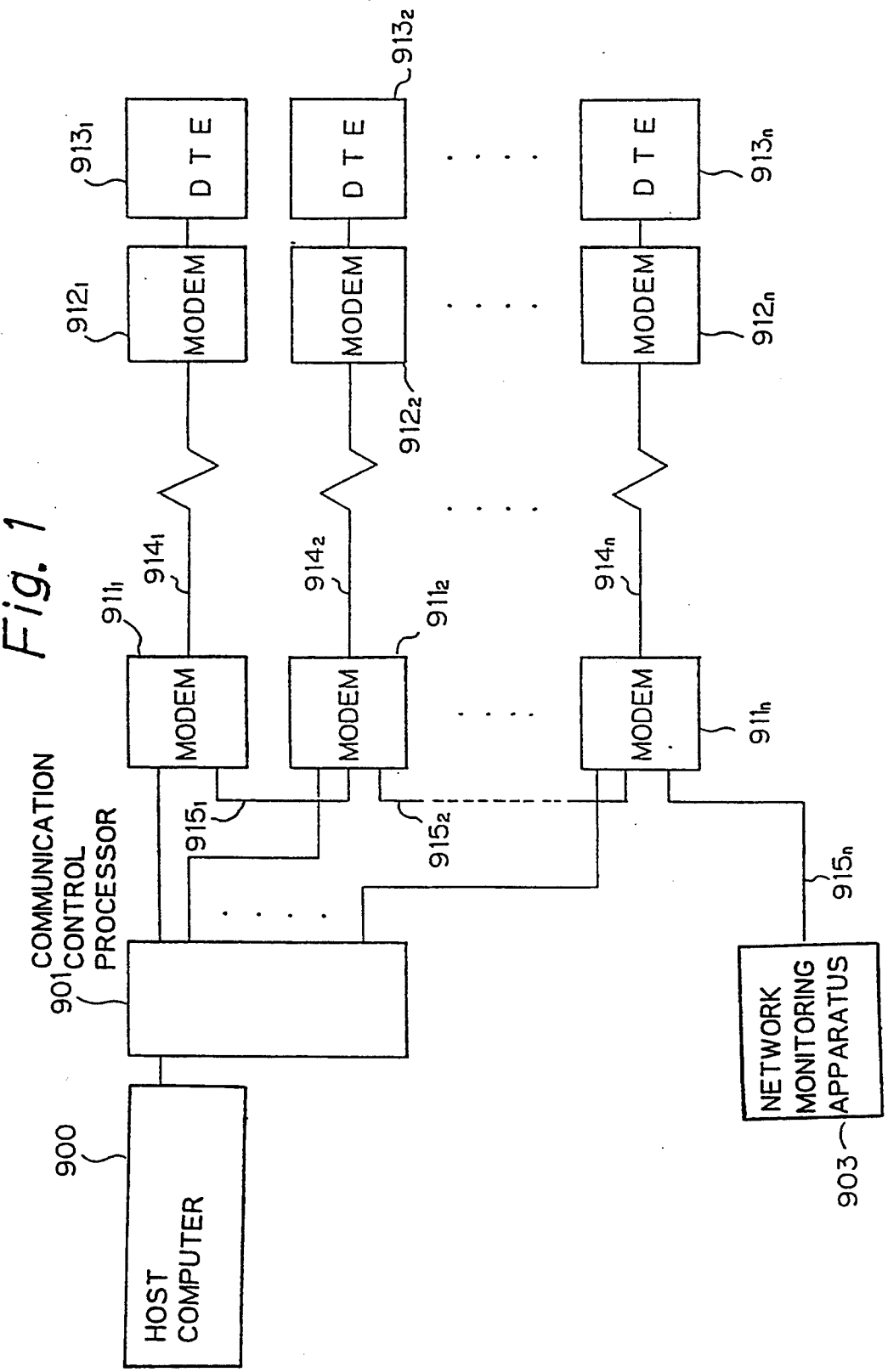
FIG. 1 is a diagram illustrating an on-line information processing system wherein a plurality of pieces of data terminal equipment are connected through analog transmission lines to a host computer.

The network monitoring apparatus 903 (FIG. 1) sends a first command to the microprocessor unit 70 in each of the modems at the near end (such as the modems $911_1$ to $911_n$ in FIG. 1) directly connected to the network monitoring apparatus 903 through the MDMS interface circuit 81 in the modem. The first command requests information on the conditions of the modems at the near end, and the modems at the far end (such as the modems $912_1$ to $912_n$ in FIG. 1) connected to the modems at the near end through the analog transmission lines. When the command requests the information on the conditions of the modem at the near end, the modem at the near end returns the information on the conditions of the modem to the network monitoring apparatus 903 through the MDMS interface circuit 81. When the command requests the information on the conditions of the modem at the far end, the modem at the near end generates a secondary signal carrying a second command requesting the information on the conditions of the modem at the far end, which is connected to the modem at the near end through the analog transmission line, and supply the secondary signal to the modulation unit 40 to be modulated and transmitted to the modem at the far end through the secondary channel. When the modem at the far end receives the modulated secondary signal through the secondary channel, the modulated secondary signal is demodulated to regenerate a secondary signal, and the secondary signal is supplied to the microprocessor unit 70 in the modem at the far end. In response to the second command, the modem at the far end generates and returns a first response containing the requested information through the secondary channel to the microprocessor unit 70 in the modem at the near end. Receiving the first response, the microprocessor unit 70 in the modem at the near end generates and returns a second response containing the requested information through the MDMS interface circuit 81 to the network monitoring apparatus 903. The MDMS interface circuit 81 is provided for converting an unbalanced signal carrying the above response and transmitted from the microprocessor unit 70, to a balanced signal, and converting a balanced signal carrying the above command and transmitted from the network monitoring apparatus 903, to an unbalanced signal.

Figure 7B:
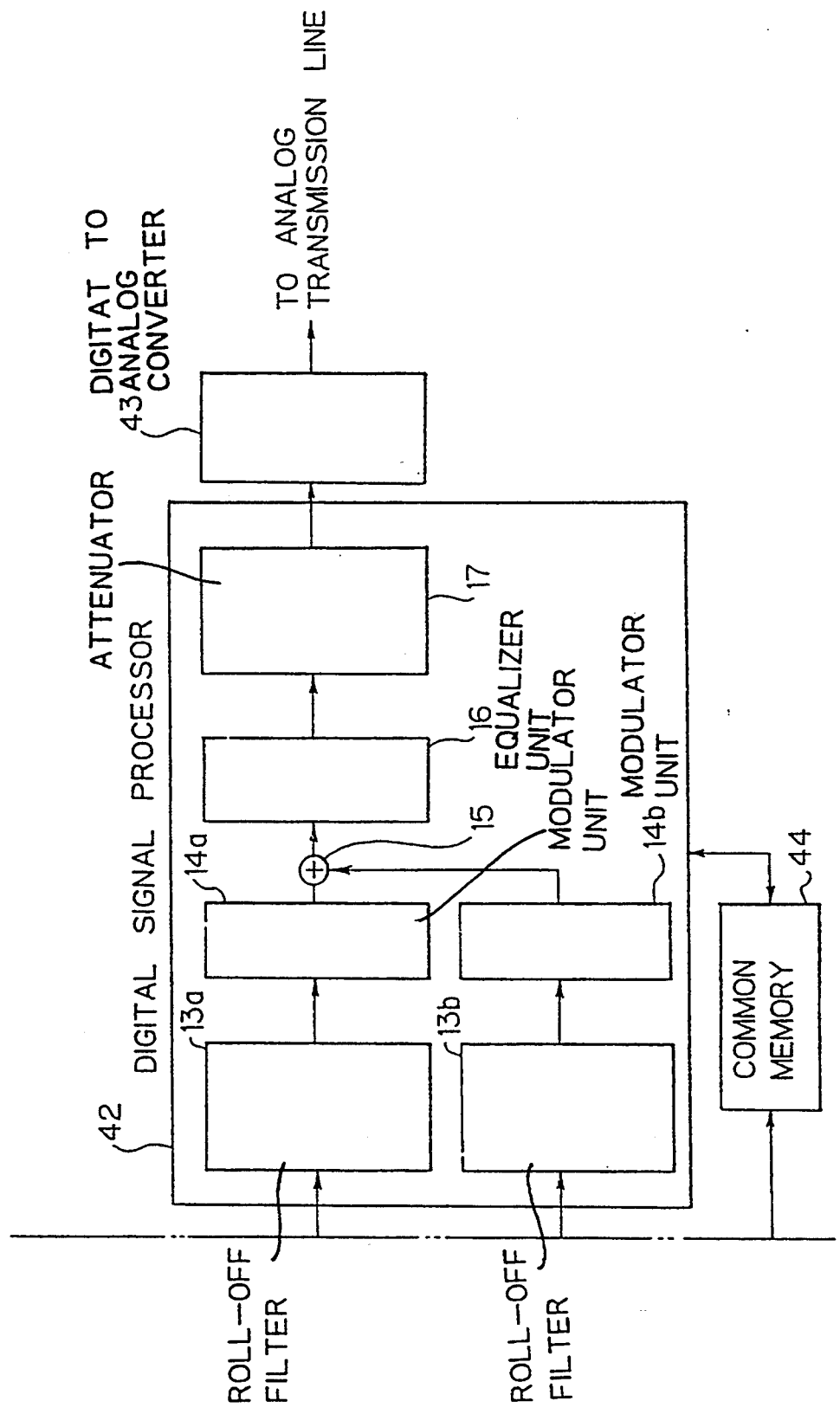
FIGS. 7(A and B), 8(A and B) and 9 are a block diagram illustrating the construction of the modem as an embodiment of the present invention.
Figure 8A:
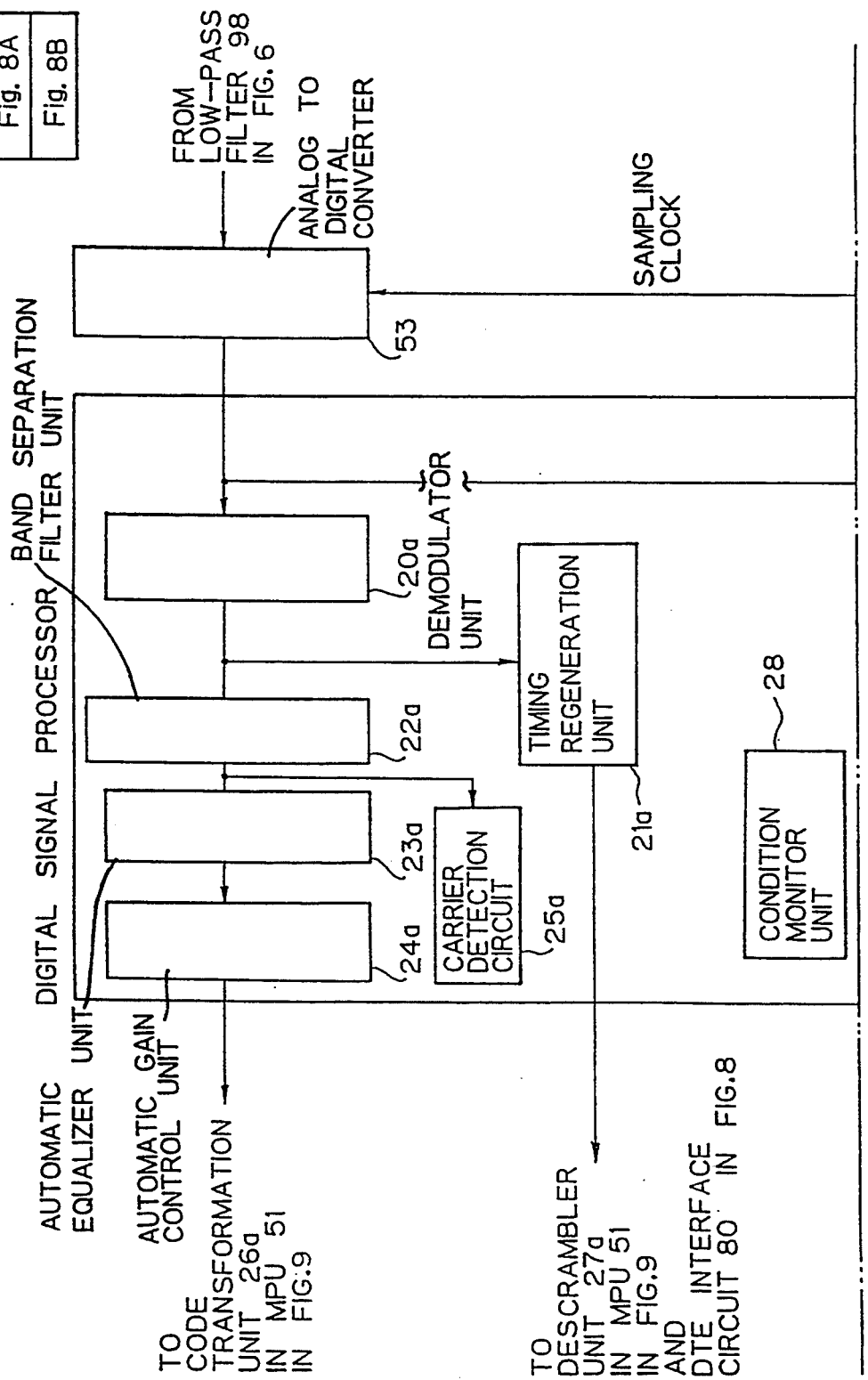
Figure 8B:
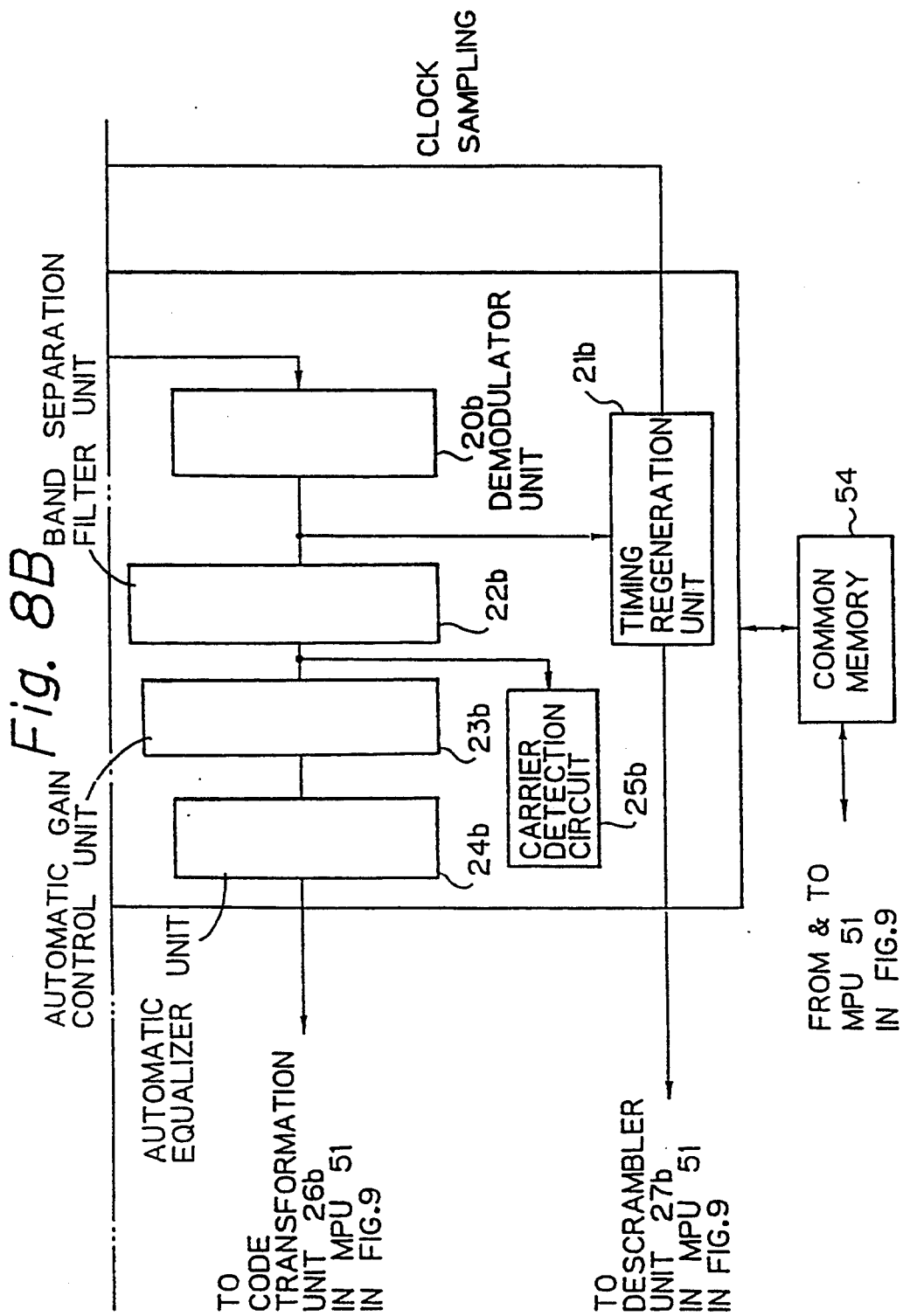
Figure 9:
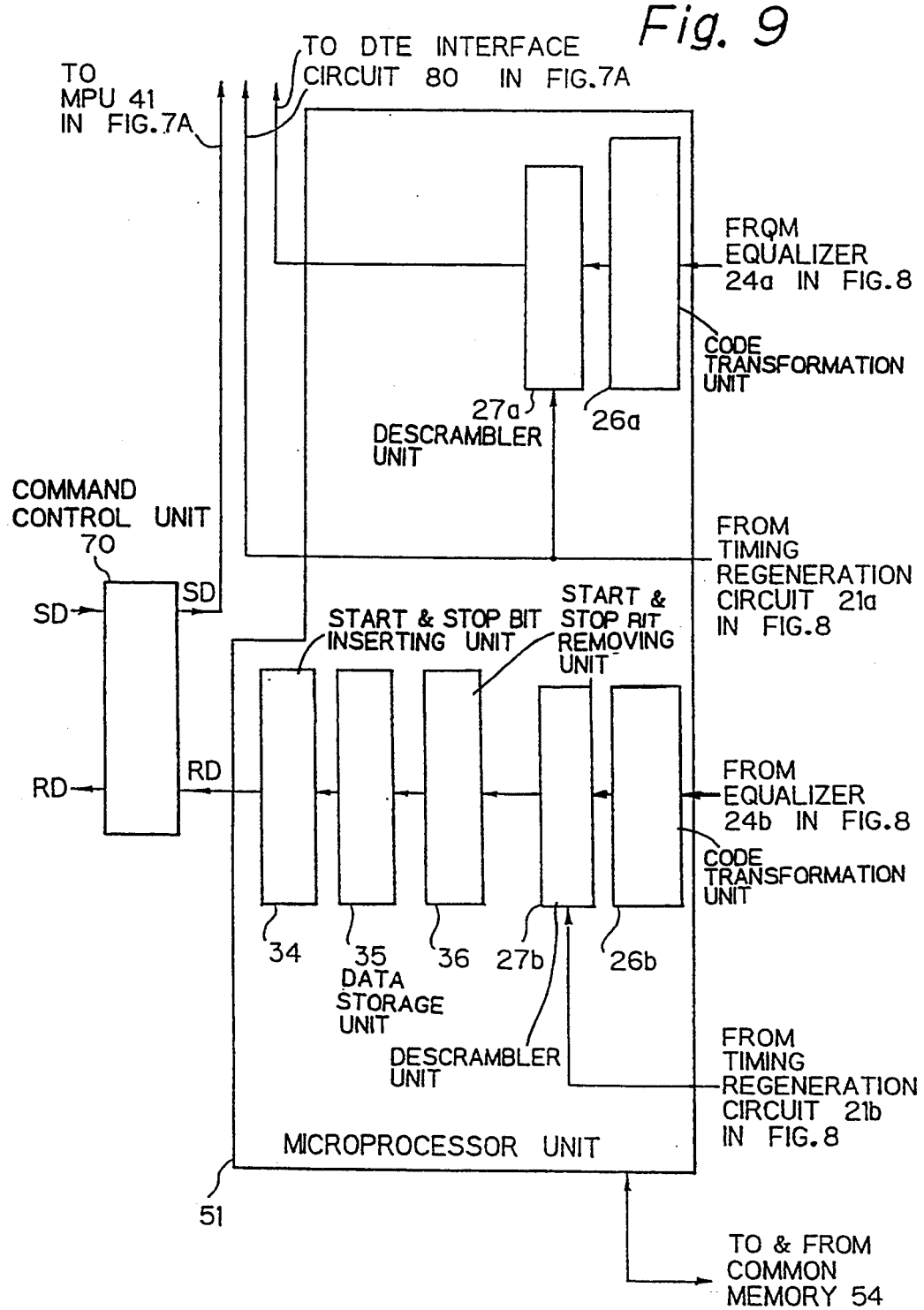

Details of Embodiment of Modem (FIGS. 7, 8, and 9)

FIGS. 7, 8 and 9 are a block diagram illustrating the construction of the modem as an embodiment of the present invention. Details of the DTE interface circuit 80 and the modulation unit 40 are indicated in FIG. 7, details of the analog to digital converter 53 and the demodulation unit 52 in the demodulation unit 50 are indicated in FIG. 8, and details of the microprocessor unit 51 in the demodulation unit 50 are indicated in FIG. 9.

Details of Modulation (FIG. 7)

In FIG. 7, reference numerals 11a and 11b each denote a scrambler unit, 12a and 12b each denote a code transformation unit, 13a and 13b each denote a roll-off filter, 14a and 14b each denote a modulator unit, 16 denotes an equalizer, 17 denotes an attenuator, 18a and 18b each denote a pattern generating unit, 31 denotes a start & stop bit removing unit, 32 denotes a data storage unit, 33 denotes a start & stop bit inserting unit, and 44 denotes a common memory. The operations of the modulation unit 40 are controlled by the microprocessor unit 41, and the digital signal processor 42 operates under the control of the microprocessor unit 41. The elements indicated by a block in the microprocessor unit 41 and the digital signal processor 42 may be respectively realized by a software unit, and the operations of the respective software units are performed by a multi-task operation under the control of the microprocessor unit 41, although any unit may be replaced by a hardware unit performing the same operation. The digital signal processor 42 may comprise more than one digital signal processor. In this case, a multi-processor system is constructed by the more than one digital signal processor and the microprocessor unit 41, and the microprocessor unit 41 controls the multi-processor system. The common memory 44 is provided for common use by the microprocessor unit 41 and the digital signal processor 42. The microprocessor unit 41 and the (or each) digital signal processor 42 can access the common memory 44 in a time sharing manner. A command from the microprocessor unit 41 is given to the digital signal processor 42 when the command is written in a predetermined address in the common memory 44 by the microprocessor unit 41 and read by the digital signal processor 42.

The pattern generating units 18a and 18b are provided for generating predetermined patterns to be inserted in training signals which are transmitted preceding the main signal and the secondary signal, respectively. The patterns generated by the pattern generating units 18a and 18b may be supplied to the inputs of the scrambler units 11a and 11b, respectively, or to the inputs of the code transformation units 12a and 12b, respectively.

Figure 10:
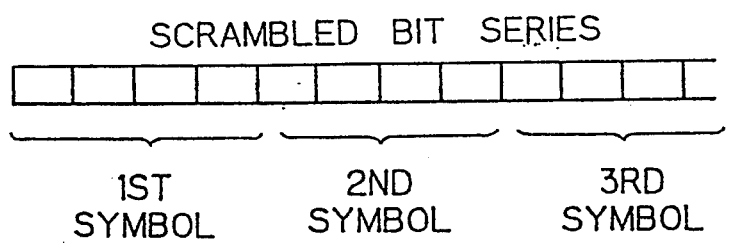
FIG. 10 is a diagram illustrating a bit series and each predetermined number of successive bits corresponding to each symbol.

The main signal supplied to the modulation unit 40 from the data terminal equipment through the DTE interface circuit 80, is scrambled by the scrambler unit 11a, and each predetermined number of successive bits (corresponding to each symbol) in the scrambled main signal (as indicated in FIG. 10) is transformed to a data signal point in a vector signal space in accordance with a predetermined coding method, for example, as stipulated in the CCITT recommendation V.27 for the phase shift keying modulation, or in the CCITT recommendation V.29 for the quadrature amplitude modulation. The output of the code transformation unit 12a is supplied to the roll-off filter 13a provided in the digital signal processor 42 to eliminate components other than the base band components in the output of the code transformation unit 12a. The output of the roll-off filter 13a is supplied to the modulator unit 14a to be modulated to generate a first passband signal where frequency components contained in the first passband signal are within the first frequency band corresponding to the main channel.

Figure 11:
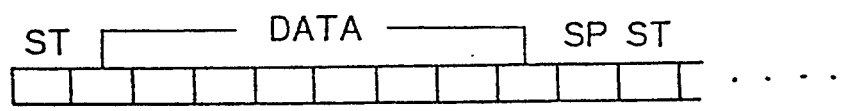
FIG. 11 is a diagram illustrating a bit series containing a character data accompanied with a start bit and a stop bit.
Figure 12:
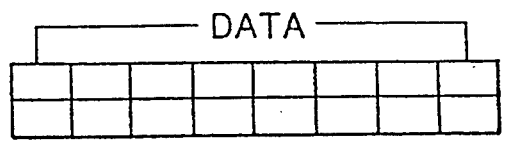
FIG. 12 is a diagram illustrating character data stored in the data storage unit.

Parallel to the above modulating operation of the main signal, the secondary signal supplied from the microprocessor unit 70 is supplied to the start & stop bit removing unit 31 in the microprocessor unit 41. The secondary signal supplied from the microprocessor unit 70 to the modulation unit 40 contains at least one set of a predetermined number of (for example, eight) successive bits representing to a character data, a start bit preceding each set of the predetermined number of successive bits, and a stop bit following each set of the predetermined number of successive bits, as indicated in FIG. 11. The start & stop bit removing unit 31 removes the start bit and the stop bit in a bit series carried by the secondary signal, and the character data represented by the set of the predetermined number of successive bits is temporarily stored in the data storage unit 32, as indicated in FIG. 12. The data storage unit 32 is necessary when the transmission rate in the transmission of the secondary signal between the microprocessor unit 70 and the modulation unit 40 is higher compared with the transmission rate in the secondary channel through the analog transmission line. In this embodiment, the transmission rate in the transmission of the secondary signal between the microprocessor unit 70 and the modulation unit 40 may be 8 kbps, and the transmission rate in the secondary channel through the analog transmission line may be 75 bps. Thus, the operation of the microprocessor unit 70 is not affected by the low transmission rate in the secondary channel.

The microprocessor unit 41 monitors the data storage unit 32 regarding whether or not any character data is stored therein. When the microprocessor unit 41 determines that any character data is stored in the data storage unit 32, the microprocessor unit 41 activates the modulator unit 14b in the digital signal processor 42 and the pattern generation unit 18b to generate a carrier signal for the secondary channel and transmit a training signal for the secondary channel. The carrier signal for the secondary channel is generated in the modulator unit 14b. Then, the microprocessor unit 41 reads out each character data stored in the data storage unit 32 in the order each character data is stored therein to supply the character data to the start & stop bit inserting unit 33. When the microprocessor unit 41 determines that no character data is remaining in the data storage unit 32, the microprocessor unit 41 controls the digital signal processor 42 to stop the transmission of the carrier signal for the secondary channel. The start & stop bit inserting unit 33 inserts a start bit before each character data, and a stop bit after each character data to generate a bit series as indicated in FIG. 11. The start bit and the stop bit are inserted so that each character data can easily be recognized when the bit series is received and demodulated in the modem at the other end of the analog transmission line. The bit series generated by the start & stop bit inserting unit 33 is supplied to the scrambler 11b to scramble the bit series, and the scrambled bit series is supplied to the code transformation unit 12b. Each predetermined number of successive bits (corresponding to each symbol) in the scrambled main signal (as indicated in FIG. 10) is transformed to a data signal point in a vector signal space in accordance with a predetermined coding method, for example, as stipulated in the CCITT recommendation V.27 for the phase shift keying modulation, or in the CCITT recommendation V.29 for the quadrature amplitude modulation. As explained before, preferably, the same type of modulation as in the main channel is used in the secondary channel. The output of the code transformation unit 12b is supplied to the roll-off filter 13b provided in the digital signal processor 42 to eliminate components other than the base band components in the output of the code transformation unit 12b. The output of the roll-off filter 13b is supplied to the modulator unit 14b to be modulated to generate a second passband signal where frequency components contained in the second passband signal are within the second frequency band corresponding to the secondary channel.

The outputs of the modulator units 14a and 14b are summed by the signal adder 15 to generate a frequency division multiplexed passband signal. The frequency division multiplexed passband signal is then equalized by the equalizer unit 16, attenuated by the attenuator 17, and converted to an analog form by the digital to analog converter 43.

As explained above, a pair of software units performing similar operations are provided for the respective operations such as the scrambling operation, the code transformation, the roll-off filtering, and the modulation. Therefore, software and hardware in the microprocessor unit 41 and the digital signal processor 42 can be made common, and thus the total size of and cost for the software and hardware can be reduced.

Details of Demodulation (FIGS. 8 and 9)

In FIG. 8, reference numerals 20a and 20b each denote a demodulator unit, 21a and 21b each denote a timing regeneration unit, 22a and 22b each denote a band separation unit, 23a and 23b each denote an automatic gain control unit, 24a and 24b each denote an automatic equalizer unit, 25a and 25b each denote a carrier detection unit, 28 denotes a condition monitor unit, and 54 denotes a common memory. The elements indicated by a block in the microprocessor unit 51 and the digital signal processor 52 may be respectively realized by a software unit, and the operations of the respective software units are performed by a multi-task operation under the control of the microprocessor unit 51, although any unit may be replaced by a hardware unit performing the same operation. The digital signal processor 52 may comprise more than one digital signal processor. In this case, a multi-processor system is constructed by the more than one digital signal processor and the microprocessor unit 51, and the microprocessor unit 51 controls the multi-processor system.

The analog frequency division multiplexed passband signal filtered through the low-pass filter 98 in FIG. 6 is supplied to the analog to digital converter 53 to be converted to a digital form. Then, the frequency division multiplexed passband signal is supplied to the demodulator units 20a and 20b.

Figure 2:
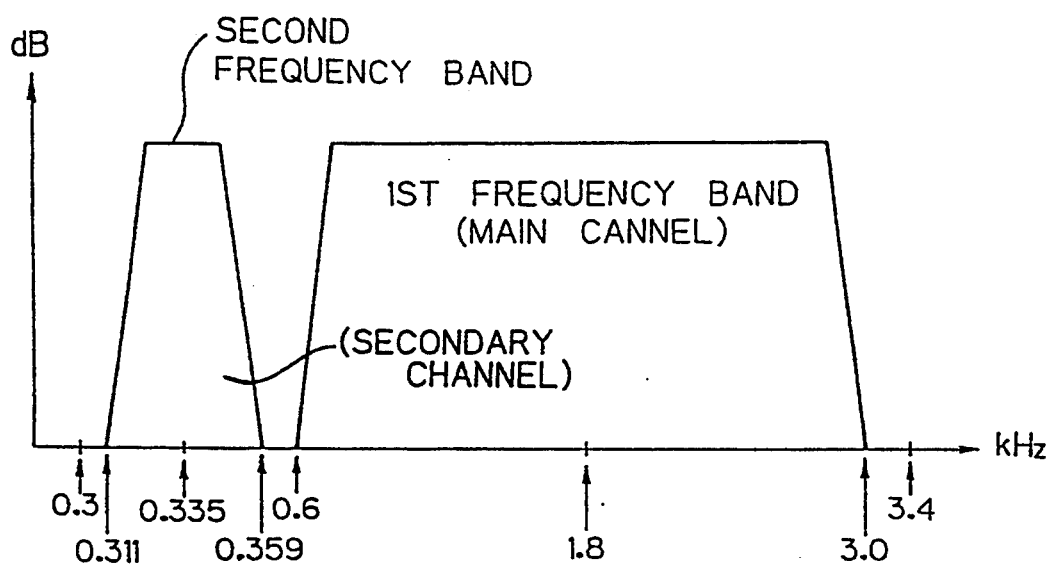
FIG. 2 is a diagram illustrating frequency bands allocated for the main channel and the secondary channel within the frequency band of the analog transmission line (0.3 to 3.4 kHz)
Figure 3:
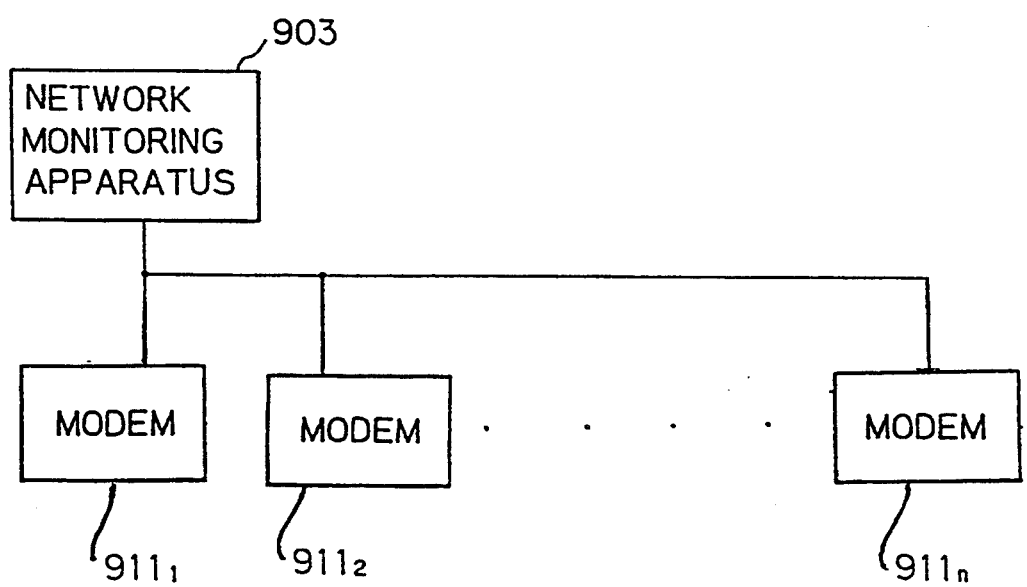
FIG. 3 is a diagram illustrating a connection between the network monitoring apparatus 903 and the plurality of modems $911_1$ to $911_n$.
Figure 4:
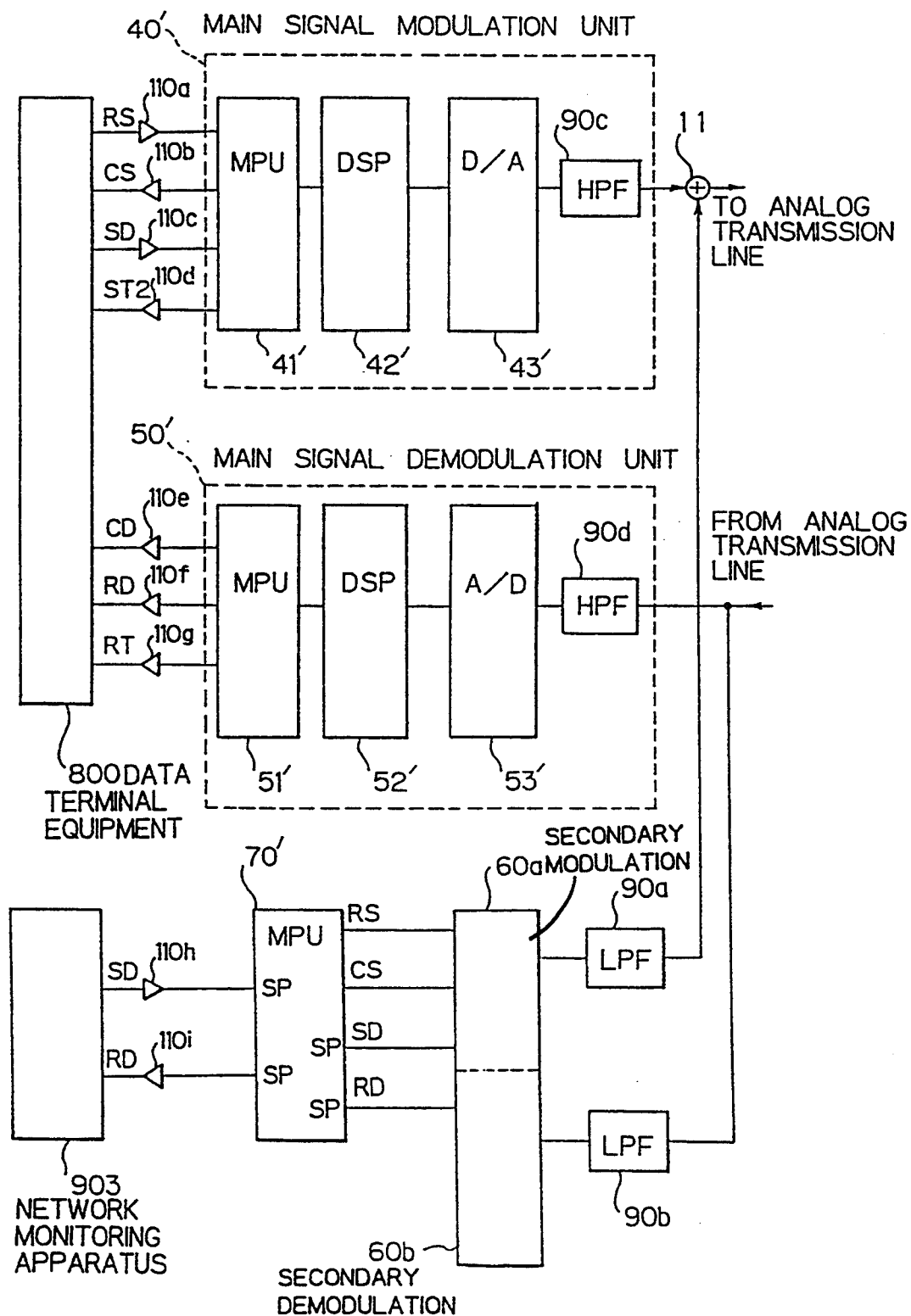
FIG. 4 is a diagram illustrating a construction of a conventional modem which can be used in the system as indicated in FIG. 1.

The demodulator unit 20a receives the frequency division multiplexed passband signal, and shifting frequencies of the frequency division multiplexed passband signal by a first predetermined frequency (−1,800 Hz corresponding to the center frequency of the frequency band for the main channel as indicated in FIG. 2) to transform the frequency division multiplexed passband signal to a first base band signal. Then, the output of the demodulator 20a is supplied to the band separation filter 22a to eliminate frequency components other than the frequency components within the frequency band for the main channel, and thus a first base band signal is obtained as an output of the band separation filter 22a. The amplitude of the output of the band separation filter 22a is controlled by the automatic gain control unit 23a, and the output of the automatic gain control unit 23a is equalized by the automatic equalizer unit 24a. The output of the automatic equalizer unit 24a is supplied to the code transformation unit 26a in the microprocessor unit 51 indicated in FIG. 9. The timing information in the received signal in the secondary channel is extracted from the output of the demodulator unit 20a by the timing regeneration unit 21a, and the carrier detection is carried out by the carrier detection unit 25a by monitoring the output of the band separation filter unit 22a. Further, to obtain the information on the conditions of the modem, the condition monitor unit 28 is provided. The condition monitor unit 28 monitors the received and demodulated signal to examine the signal to noise ratio (S/N) in the received signal, and an error rate in the demodulated signal, and the condition monitor unit 28 also monitors alarm conditions of the modem. The information on the conditions of the modem, obtained by the condition monitor unit 28, is written in predetermined addresses in the common memory 54.

The common memory 54 is provided for common use by the microprocessor unit 51 and the digital signal processor 52. The microprocessor unit 51 and the (or each) digital signal processor 52 can access the common memory 54 in a time sharing manner. A command from the microprocessor unit 51 is given to the digital signal processor 52 when the command is written in a predetermined address in the common memory 54 by the microprocessor unit 51 and read by the digital signal processor 52.

Parallel to the above demodulating operation in the main channel, the demodulator unit 20b receives the frequency division multiplexed passband signal, and shifting frequencies of the frequency division multiplexed passband signal by a second predetermined frequency (−335 Hz corresponding to the center frequency of the frequency band for the secondary channel as indicated in FIG. 2) to transform the frequency division multiplexed passband signal to a second base band signal. Then, the output of the demodulator 20b is supplied to the band separation filter 22b to eliminate frequency components other than the frequency components within the frequency band for the secondary channel, and thus a second base band signal is obtained as an output of the band separation filter 22b. The amplitude of the output of the band separation filter 22b is controlled by the automatic gain control unit 23b, and the output of the automatic gain control unit 23b is equalized by the automatic equalizer unit 24b. The output of the automatic equalizer unit 24b is supplied to the code transformation unit 26b in the microprocessor unit 51 indicated in FIG. 9. The timing information in the received signal in the secondary channel is extracted from the output of the demodulator unit 20b by the timing regeneration unit 21b, and the carrier detection is carried out by the carrier detection unit 25b by monitoring the output of the band separation filter unit 22b.

In FIG. 9, reference numerals 26a and 26b each denote a code transformation unit, 27a and 27b each denote a descrambler unit, 34 denotes a start & stop bit inserting unit, 35 denotes a data storage unit, and 36 denotes a start & stop bit removing unit.

The output of the automatic equalizer unit 24a represents a data signal point in the vector signal space for each symbol corresponding to the predetermined number of successive bits carried by the main signal. The code transformation unit 26a receives the output of the automatic equalizer unit 24a, and transforms each data signal point to the corresponding predetermined number of successive bits to obtain a scrambled bit series. The scrambled bit series is descrambled by the descrambler unit 27a to regenerate a descrambled bit series transmitted through the main channel.

Parallel to the above operation in the main channel, the output of the automatic equalizer unit 24b represents a data signal point in the vector signal space for each symbol corresponding to the predetermined number of successive bits carried by the secondary signal. The code transformation unit 26b receives the output of the automatic equalizer unit 24b, and transforms each data signal point to the corresponding predetermined number of successive bits to obtain a scrambled bit series. The scrambled bit series is descrambled by the descrambler unit 27b to regenerate a descrambled bit series transmitted through the secondary channel. Due to the provision of the start & stop bit inserting unit 33 in the microprocessor unit 41 in FIG. 7, the descrambled bit series in the secondary channel contains the start bit and the stop bit before and after each character data as indicated in FIG. 11. The start & stop bit removing unit 36 receives the descrambled bit series output from the descrambler unit 27b, and removes the start bit and the stop bit before and after each character data. Each character data is temporarily stored in the data storage unit 35 as indicated in FIG. 12. As explained above, the operations from the receipt of the secondary signal to the temporary storage in the data storage 35 are carried out with a low rate corresponding to the low transmission rate in the secondary channel. Then, each character data stored in the data storage unit 35 is read out in the order each character data is stored therein, and a start bit and a stop bit are inserted before and after each character data, respectively, to generate and transmit to the microprocessor unit 70 a bit series in the start & stop system at the high transmission rate.

Besides the above processing operations of the received signals, when requested by the microprocessor unit 70, the microprocessor unit 51 reads the information on the conditions of the modem from the common memory 54, and transmits the same to the microprocessor unit 70. In the transmission of the information, a start bit and a stop bit are inserted before and after each character data of the information by using the start & stop bit inserting unit 33.

As explained above, a pair of software units performing similar operations are provided for the respective operations such as the demodulation, the band separation filtering, the automatic gain control, the automatic equalization, the code transformation, and the descrambling operation. Therefore, software and hardware in the microprocessor unit 51 and the digital signal processor 52 can be made common, and thus the total size of and cost for the software and hardware can be reduced.

I claim:

1. A modulator comprising:
   first modulating means in a clock synchronized system for receiving a first clock synchronized digital signal, and modulating the first clock synchronized digital signal to generate a first clock synchronized modulated signal, where frequency components contained in the first clock synchronized modulated signal are within a first frequency band;
   transforming means for receiving a second digital signal in a start-stop format containing at least one set of a predetermined number of successive bits corresponding to a character data, start bit data preceding each set of said predetermined number of successive bits, and stop bit data following each set of said predetermined number of successive bits, and removing said start bit data and said stop bit data from the second digital signal to generate a third clock synchronized digital signal containing said character data;
   second modulating means for receiving said third clock synchronized digital signal, and modulating the third clock synchronized digital signal to generate a second clock synchronized modulated signal, where frequency components contained in the second clock synchronized modulated signal are within a second frequency band which is separated from the first frequency band; and
   signal adding means for receiving said first and second clock synchronized modulated signals, and adding said first and second modulated signals to generate a frequency division multiplexed signal.

2. A modulator according to claim 1, further comprising a digital signal generating means for generating the second digital signal to supply the second digital signal to the transforming means.

3. A modulator according to claim 1, wherein the first and second modulating means perform the same type of modulation, and the first and second modulating means comprises at least one digital signal processor.

4. A modulator according to claim 3, wherein the first and second modulating means performs one of the phase shift keying or the quadrature amplitude modulation.

5. A modulator according to claim 1, wherein at least one portion of the operation performed by the second modulating means is similar to at least one portion of the operation performed by the first modulating means, and the first and second modulating means comprises at least one digital signal processor.

6. A modulator according to claim 5, wherein the first modulating means performs quadrature amplitude modulation, and the second modulating means performs phase shift keying.

7. A modulator comprising:
   first modulating means in a clock synchronized system for receiving a first clock synchronized digital signal, and modulating the first clock synchronized digital signal to generate a first clock synchronized modulated signal, where frequency components contained in the first clock synchronized modulated signal are within a first frequency band;
   transforming means for receiving a second digital signal in a start-stop format containing at least one set of a predetermined number of successive bits corresponding to a character data, start bit data preceding each set of said predetermined number of successive bits, and stop bit data following each set of said predetermined number of successive bits, and removing said start bit data and said stop bit data from the second digital signal to generate a third clock synchronized digital signal containing said character data;
   second modulating means for receiving said third clock synchronized digital signal, and modulating the third clock synchronized digital signal to generate a second clock synchronized modulated signal, where frequency components contained in the second clock synchronized modulated signal are within a second frequency band which is separated from the first frequency band; and
   signal adding means for receiving said first and second clock synchronized modulated signals, and adding said first and second modulated signals to generate a frequency division multiplexed signal;
   a data storage means, provided between the transforming means and the second modulating means, for temporarily storing the character data contained in the third digital signal, and supplying the character data stored in the data storage means to the second modulating means.

8. A modulator according to claim 7, further comprising a start & stop bit inserting means, provided between the data storage means and the second modulating means, for receiving each character data from the data storage means, inserting a start bit before each character data supplied from the data storage means, and a stop bit after each character data, and supplying the character data with the start and stop bits to the second modulating means.

9. A demodulator comprising:
   a first demodulating means for receiving a frequency division multiplexed signal, and regenerating a first digital signal, where first and second modulated signals are frequency division multiplexed in the frequency division multiplexed signal, frequency components contained in the first modulated signal are within a first frequency band, frequency components contained in the second modulated signal are within a second frequency band which is separated from the first frequency band, the first modulated signal is equivalent to a signal generated by modulating the first digital signal, and the second modulated signal is equivalent to a signal generated by modulating a second digital signal;
   a second demodulating means for receiving the frequency division multiplexed signal., and regenerating the second digital signal containing at least one set of a predetermined number of successive bits corresponding to a character data; and
   a transforming means for receiving the second digital signal, and inserting a start bit before each set of the predetermined number of successive bits and a stop bit after each set of the predetermined number of successive bits to generate a third digital signal in a start-stop system.

10. A demodulator according to claim 9, wherein said first demodulating means comprises:
    a first frequency shifting means for receiving the frequency division multiplexed signal, and shifting frequencies of the frequency division multiplexed signal by a first predetermined frequency to transform the frequency division multiplexed signal to a fourth digital signal, where the first predetermined frequency corresponds to a center frequency of the first frequency band; and a first band separation filter means for receiving the fourth digital signal, and extracting the first digital signal; and the second demodulating means comprises:

a second frequency shifting means for receiving the frequency division multiplexed signal, and shifting the frequencies of the frequency division multiplexed signal by a second predetermined frequency to transform the frequency division multiplexed signal to a fifth digital signal, where the second predetermined frequency corresponds to a center frequency of the second frequency band; and a second band separation filter means for receiving the fifth digital signal, and extracting the second digital signal.

11. A demodulator according to claim 9, further comprising an information decoding means for receiving a digital signal in the start-stop system and decoding information carried by the digital signal.

12. A demodulator according to claim 9, wherein the first and second modulated signals are modulated by the same type of modulation, and the first and second demodulating means comprises at least one digital signal processor.

13. A demodulator according to claim 12, wherein the first and second modulated signals are modulated by one of the phase shift keying or the quadrature amplitude modulation.

14. A demodulator according to claim 9, wherein at least one portion of the operation performed by the second demodulating means is similar to at least one portion of the operation performed by the first demodulating means, and the first and second demodulating means comprises at least one digital signal processor.

15. A demodulator according to claim 14, wherein the demodulating operation performed by the first demodulating means is in accordance with the quadrature amplitude modulation, and the demodulating operation performed by the second modulating means is in accordance with the phase shift keying.

16. A demodulator according to claim 9, further comprising a data storage means, provided between the second demodulating means and the transforming means, for temporarily storing the character data contained in the second digital signal, and supplying the character data stored in the data storage means to the transforming means.

17. A demodulator according to claim 9, wherein the second digital signal further contains a start bit preceding each character data, and a stop bit following each character data, and said demodulator further comprises a start and stop bit removing means, provided between the second demodulating means and the data storage means, for receiving the second digital signal from the second demodulating means, removing a start bit preceding each character data, and a stop bit following each character data, and supplying the character data without the start and stop bits to the data storage means.

18. A modem comprising a modulator and a demodulator:

the modulator comprising:

a first modulating means for receiving a first digital signal, and modulating the first digital signal to generate a first modulated signal, where frequency components contained in the first modulated signal are within a first frequency band;

a first transforming means for receiving a second digital signal containing at least one set of a predetermined number of successive bits corresponding to a character, a start bit preceding each set of the predetermined number of successive bits, and a stop bit following each set of the predetermined number of successive bits, and removing the start bit and the stop bit from the second digital signal to generate a third digital signal;

a second modulating means for receiving the third digital signal, and modulating the third digital signal to generate a second modulated signal, where frequency components contained in the second modulated signal are within a second frequency band which is separated from the first frequency band; and a signal adding means for receiving the first and second modulated signals, and adding the first and second modulated signals to generate a frequency division multiplexed signal;

the demodulator comprising:

a first demodulating means for receiving a frequency division multiplexed signal, and regenerating a fourth digital signal, where third and fourth modulated signals are frequency division multiplexed in the frequency division multiplexed signal, frequency components contained in the third modulated signal are within a third frequency band, frequency components contained in the fourth modulated signal are within a fourth frequency band which is separated from the third frequency band, the third modulated signal is equivalent to a signal generated by modulating the fourth digital signal, and the fourth modulated signal is equivalent to a signal generated by modulating a fifth digital signal;

a second demodulating means for receiving the frequency division multiplexed signal, and regenerating the fifth digital signal containing at least one set of a predetermined number of successive bits corresponding, to a character data; and a transforming means for receiving the fifth digital signal, and inserting a start bit before each set of the predetermined number of successive bits and a stop bit after each set of the predetermined number of successive bits to generate a sixth digital signal in a start-stop system.

19. A modem according to claim 18, wherein the first demodulating means in the demodulator comprises:

a first frequency shifting means for receiving the frequency division multiplexed signal, and shifting frequencies of the frequency division multiplexed signal by a first predetermined frequency to transform the frequency division multiplexed signal to a seventh digital signal, where the first predetermined frequency corresponds to a center frequency of the third frequency band; and a first band separation filter means for receiving the seventh digital signal, and extracting the fourth digital signal; and the second demodulating means comprises:

a second frequency shifting means for receiving the frequency division multiplexed signal, and shifting the frequencies of the frequency division multiplexed signal by a second predetermined frequency to transform the frequency division multiplexed signal to an eighth digital signal, where the second predetermined frequency corresponds to a center frequency of the fourth frequency band; and a second band separation filter means for receiving the eighth digital signal, and extracting the fifth digital signal.

20. A modem according to claim 18, further comprising:

a digital signal generating means for generating the second digital signal to supply the second digital signal to the second modulating means; and an information decoding means for receiving an eighth digital signal in the start-stop system and decoding information carried by the eighth digital signal.

21. A modem according to claim 18, wherein the first and second modulating means perform the same type of modulation, the first and second modulated signals are modulated by the same type of modulation, and the first and second modulating means and the first and second demodulating means comprises at least one digital signal processor.

22. A modulator according to claim 21, wherein the first and second modulating means performs one of the phase shift keying or the quadrature amplitude modulation, and the first and second modulated signals are modulated by one of the phase shift keying and the quadrature amplitude modulation.

23. A modem according to claim 18, wherein the modulator further comprises a data storage means, provided between the first transforming means and the second modulating means, for temporarily storing the character data contained in the third digital signal, and supplying the character data stored in the data storage means to the second modulating means.

24. A modem according to claim 23, wherein the modulator further comprises a start & stop bit inserting means, provided between the data storage means and the second modulating means, for receiving each character data from the data storage means, inserting a start bit before each character data supplied from the data storage means, and a stop bit after each character data, and supplying the character data with the start and stop bits to the second modulating means.

25. A modem according to claim 18, wherein the demodulator further comprises a data storage means, provided between the second demodulating means and the second transforming means, for temporarily storing the character data contained in the fifth digital signal, and supplying the character data stored in the data storage means to the second transforming means.

26. A modem according to claim 25, wherein the seventh digital signal further contains a start bit preceding each character data, and a stop bit following each character data, the demodulator further comprises a start and stop bit removing means, provided between the second demodulating means and the data storage means, for receiving the fifth digital signal from the second demodulating means, removing a start bit preceding each character data, and a stop bit following each character data, and supplying the character data without the start and stop bits to the data storage means.

27. A modem according to claim 18, wherein at least one portion of the operation performed by the second modulating means is similar to at least one portion of the operation performed by the first modulating means, at least one portion of the operation performed by the second demodulating means is similar to at least one portion of the operation performed by the first demodulating means, and the first and second modulating means and the first and second demodulating means comprises at least one digital signal processor.

28. A modulator according to claim 21, wherein the first modulating means performs the quadrature amplitude modulation, the second modulating means performs the phase shift keying, the demodulating operation performed by the first demodulating means is in accordance with the quadrature amplitude modulation, and the demodulating operation performed by the second modulating means is in accordance with the phase shift keying.

* * * * *